Aug. 6, 1935.  Q. A. GLADDEN  2,010,260
TIRE AND RIM ASSEMBLY
Filed Nov. 7, 1934  2 Sheets-Sheet 1

Inventor
Q. A. Gladden

By Clarence A. O'Brien
Attorney

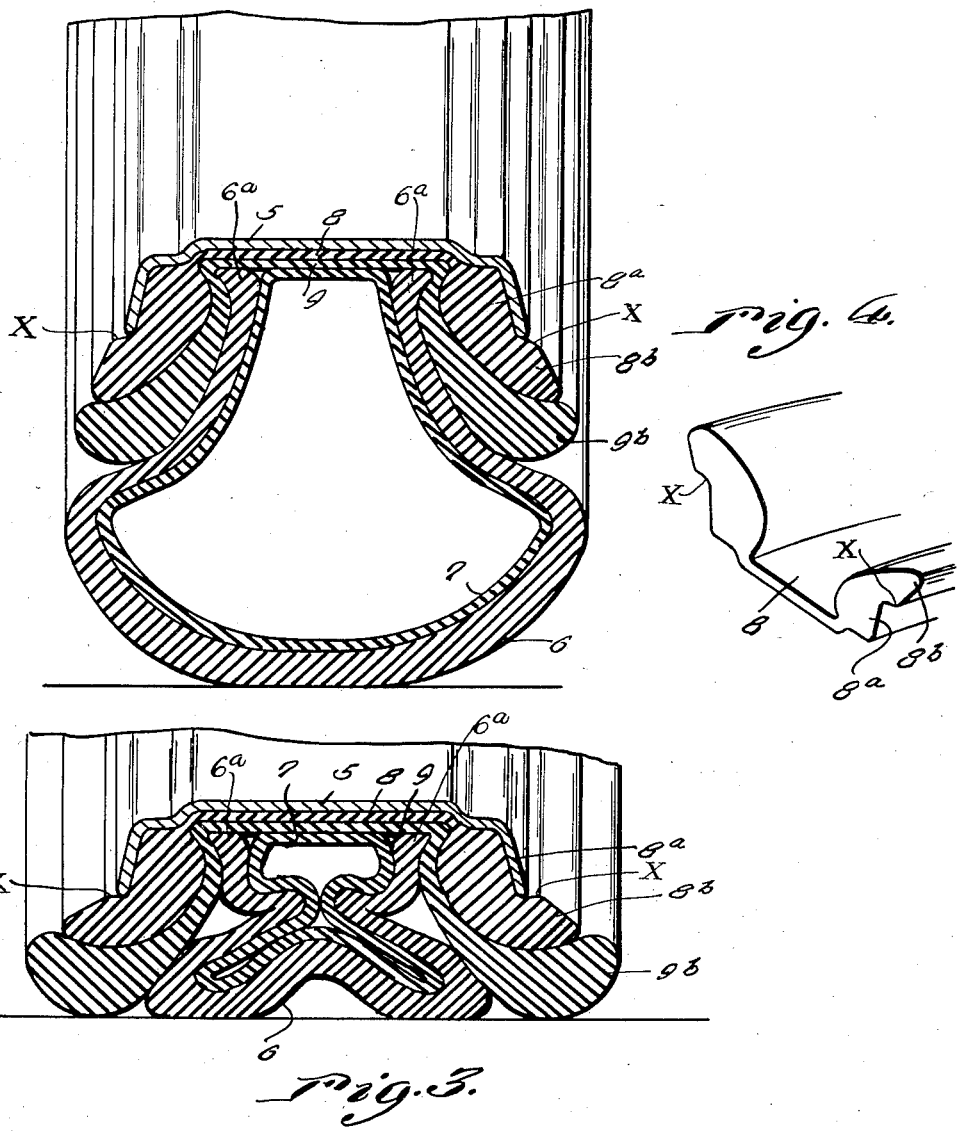

Patented Aug. 6, 1935

2,010,260

UNITED STATES PATENT OFFICE 2,010,260

TIRE AND RIM ASSEMBLY

Quincy A. Gladden, Cincinnati, Ohio

Application November 7, 1934, Serial No. 751,955

7 Claims. (Cl. 152—10)

This invention relates to a tire and rim assembly and more particularly to a pneumatic tire and rim assembly particularly designed for vehicular wheels.

An object of the present invention is to provide in an assembly of the character above mentioned means tending to prevent accidents occasioned by blow-outs, and also to protect the inner tube and tire casing against rim cuts which generally always results from riding on a flat tire.

A further object of the present invention is to provide a tire and rim assembly wherein, upon a blow-out or loss of air a resilient tread will be still provided for the wheel which will permit easy riding without damage to or requiring the removal of the pneumatic tire from the rim.

The invention together with its objects and advantages will be best understood from a study of the following description taken in connection with the accompanying drawings wherein:

Figure 2 is a sectional view taken substantially on the line 2—2 of Figure 1.

Figure 3 is a view somewhat similar to Figure 2 and showing the pneumatic tire when "flat" or "deflated".

Figure 4 is a perspective view of a portion of one of the resilient rim members.

Figure 1:
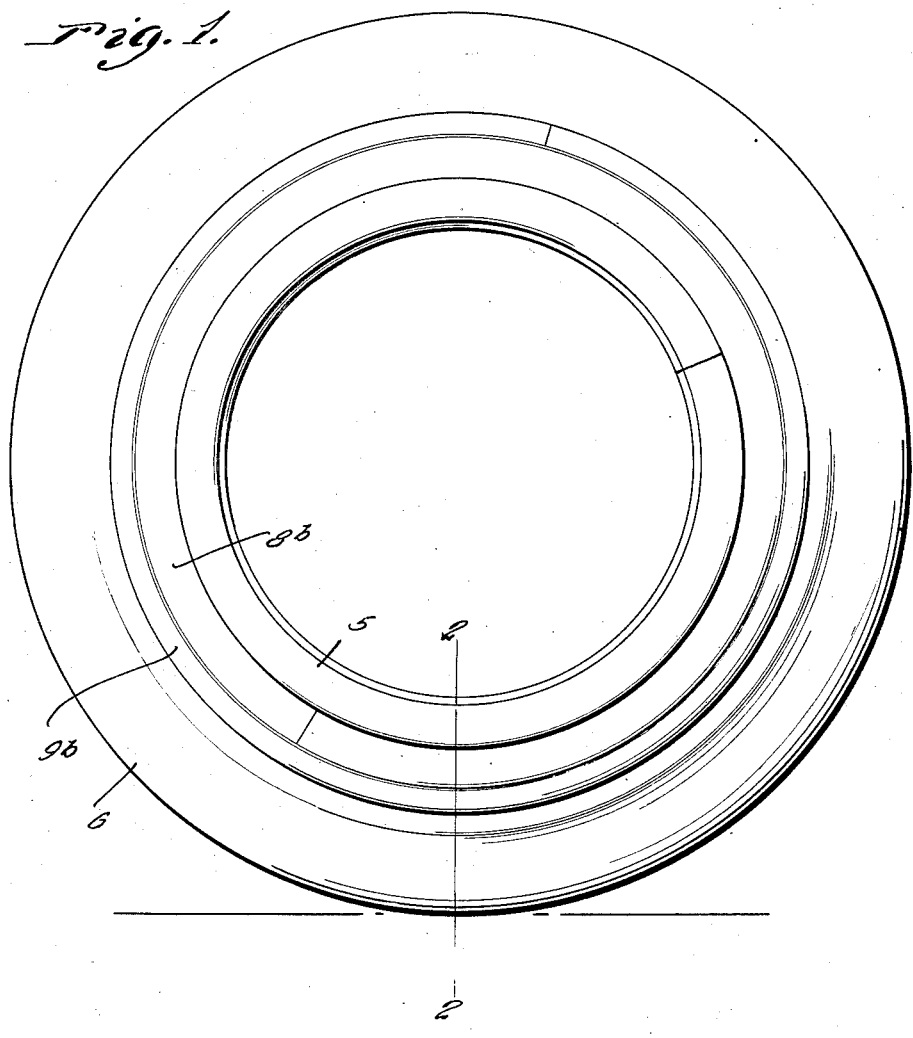
Figure 1 is a side elevational view illustrating the invention.

Referring to the drawings by reference numerals it will be seen that the tire and rim assembly, being herein shown as especially adapted to vehicular wheels of the type employed in connection with motor driven vehicles, comprises the usual tire rim 5, pneumatic tire casing 6 and inner tube 7. In addition to the parts mentioned the assembly includes what may be termed a liner rim 8 that is of elastic material preferably rubber. This rim 8 is preferably formed of hard vulcanized rubber, fits conformably within the metal rim 5 as best shown in Figure 2 and has side walls 8a of suitable thickness, the merging into beads 8b of suitable thickness, the edge of the walls or flanges of the rim 5 fitting in the angle x between the walls 8a and beads 8b of the rim 8 as also best shown in Figure 2.

Fitting within the liner rim 8 is a second elastic buffer rim 9 that is constructed on substantially the same general principles as the liner rim 8. The buffer rim 9 however is preferably made of soft rubber and has its bottom and sides cemented to the corresponding parts of the hard rubber liner rim 8. The sides or walls of the rim 9 merge into thickened edges or beads 9b that overlap the beads 8b and project laterally beyond the edges of the beads 8b.

The beaded portion 6a of the tire casing 6 fits within the soft rubber buffer rim 9, and when inflated the major portion of the tire casing projects beyond the rim 9 so that the tread of the tire casing will contact the ground as is conventional.

With this assembly however, it will be apparent that when the tire 6, due to a blow-out or for any other reason, is under inflated, the soft side walls of the tire 6 as well as the inner tube 7 will collapse inwardly from opposite sides while the tread wall of the tire will also collapse inwardly and somewhat radial to the center of the tire so as to lie, as clearly shown in Figure 3, substantially completely within the confines of the buffer rim 9. Thus, the beaded edges 9b of the walls of rim 9 will come into immediate contact with the ground providing an efficient tread for the vehicle wheel, the rims 8 and 9 in this manner serving substantially to support the weight of the vehicle wheel off of the deflated tire 6. This will serve to prevent cutting of the tire casing 6 by the rim when the automobile is driven with the tire 6 deflated. At the same time a sufficient resilient tread is provided by the auxiliary rubber rim so that if the other tires of the vehicle are slightly deflated easy riding of the vehicle even with one tire totally deflated will be had.

Figure 5:
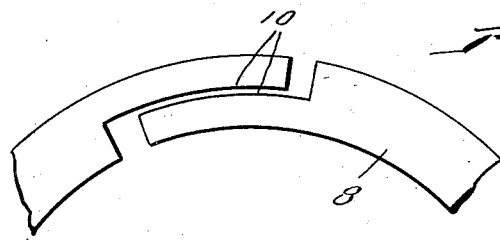
Figure 5 is a detail elevational view showing the manner of joining the ends of an elastic rim member.

Preferably, each of the rims 8 and 9 is of the split type, and at the ends formed by the split are rabbeted as at 10, with the tongues overlapping and cemented or otherwise secured together to provide a lap joint as will be appreciated from a study of Figure 5.

Having thus described the invention, what is claimed as new is:

1. In a vehicle wheel tire and rim assembly, a metallic tire rim having side walls, auxiliary rim means of elastic material and of substantially the same cross sectional shape as the metallic rim fitting within the channel of the metallic rim, and a pneumatic tire casing fitting within the channel of the auxiliary resilient rim.

2. A rim and tire assembly for pneumatic vehicle wheels comprising a metallic rim, a rim of hard vulcanized rubber fitting within the metallic rim, a rim of soft rubber fitting within the hard rubber rim, and a pneumatic tire casing having its beaded portion fitting within the soft rubber rim.

3. In a pneumatic tire and rim assembly for vehicle wheels, a metallic rim having circumferentially extending outstanding side flanges, a pneumatic tire for said rim, and an elastic rim of substantially the same cross sectional shape as the metallic rim and lining the metallic rim and adapted upon deflation of the pneumatic tire to receive the tire casing with the walls of the rubber rim engaging the ground and projecting laterally beyond the flanges of the metallic rim to protect the edges of the flanges and to prevent cutting of the tire casing by said flanges.

4. A rim assembly for pneumatic tires comprising a conventional metallic rim having side flanges, a rim of hard vulcanized rubber and of substantially the same cross sectional shape as the metallic rim and lining the metallic rim, said liner rim having sides provided with beads extending over the edges of the flanges of the metallic rim.

5. A rim assembly for pneumatic tires comprising a conventional metallic rim, a rim of hard vulcanized rubber lining the channel of the metallic rim, said liner rim having sides provided with beads extending over the edges of the sides of the metallic rim, and a rim of soft rubber fitting within the lining rim for disposition between said rim and the pneumatic tire casing.

6. Inner and outer elastic rims fitting one within the other and adapted to fit within a metallic tire rim, the outer one of said elastic rims being formed of hard rubber and the inner one of said elastic rims being formed of soft rubber and each of said rims being split and having the ends formed by the split rabbeted and jointed together.

7. In a pneumatic wheel, a metallic tire rim channel-shaped in cross section, an auxiliary rim of elastic material and of substantially the same cross sectional shape as the metallic rim, the flanges of the elastic rim being enlarged at their outer portions and extending over the edges of the flanges of the metallic rim, and a pneumatic tire casing fitting within the channel of the auxiliary elastic rim, and entirely fitting within said channel when the casing is collapsed.

QUINCY A. GLADDEN.